(12) United States Patent
Uchihara et al.

(10) Patent No.: US 10,077,067 B2
(45) Date of Patent: Sep. 18, 2018

(54) POWER STEERING DEVICE

(71) Applicant: KYB Corporation, Tokyo (JP)

(72) Inventors: Masato Uchihara, Mie (JP); Kazuyuki Okumura, Gifu (JP); Shinraku Yoshikawa, Gifu (JP); Katsumi Shimoda, Gifu (JP)

(73) Assignee: KYB Corporation, Tokyo (JP)

( * ) Notice: Subject to any disclaimer, the term of this patent is extended or adjusted under 35 U.S.C. 154(b) by 81 days.

(21) Appl. No.: 15/107,923

(22) PCT Filed: Dec. 11, 2014

(86) PCT No.: PCT/JP2014/082856
§ 371 (c)(1),
(2) Date: Jun. 24, 2016

(87) PCT Pub. No.: WO2015/098548
PCT Pub. Date: Jul. 2, 2015

(65) Prior Publication Data
US 2016/0318545 A1    Nov. 3, 2016

(30) Foreign Application Priority Data

Dec. 25, 2013  (JP) .................................. 2013-267495

(51) Int. Cl.
*B62D 5/04* (2006.01)
*B62D 3/04* (2006.01)
(Continued)

(52) U.S. Cl.
CPC ............. *B62D 5/0454* (2013.01); *B62D 3/04* (2013.01); *B62D 5/0403* (2013.01);
(Continued)

(58) Field of Classification Search
CPC ...... B62D 3/04; B62D 5/0403; B62D 5/0454; F16H 2057/0213; F16H 2057/0222
(Continued)

(56) References Cited

U.S. PATENT DOCUMENTS

2006/0182378 A1   8/2006 Chen et al.
2007/0193819 A1   8/2007 Iwasa et al.
(Continued)

FOREIGN PATENT DOCUMENTS

DE    102008042477 A1    4/2010
FR    2911171 A1    7/2008
(Continued)

*Primary Examiner* — Anne Marie M Boehler
*Assistant Examiner* — Felicia L. Brittman
(74) *Attorney, Agent, or Firm* — Hauptman Ham, LLP

(57) ABSTRACT

A power steering device includes a worm shaft configured to rotate as an electric motor is driven; a worm wheel meshed with the worm shaft, the worm wheel being configured to transmit a rotational force of the electric motor to a rack shaft configured to turn wheels; a bearing that rotatably supports a tip side of the worm shaft; a gear case that houses the worm shaft; a biasing member configured to bias the worm shaft toward the worm wheel via the bearing; and a holder including a housing hole configured to house the bearing movably in a biasing direction of the biasing member. The holder includes a plurality of bulging parts formed to bulge radially outwardly, the bulging parts being configured to come into contact with an inner peripheral surface of the gear case.

7 Claims, 6 Drawing Sheets

(51) Int. Cl.
*F16H 57/021* (2012.01)
*F16H 57/022* (2012.01)

(52) U.S. Cl.
CPC .... *B62D 5/0409* (2013.01); *F16H 2057/0213* (2013.01); *F16H 2057/0222* (2013.01)

(58) Field of Classification Search
USPC ........................................................ 180/444
See application file for complete search history.

(56) References Cited

U.S. PATENT DOCUMENTS

2013/0075189 A1   3/2013  Sekikawa et al.
2013/0133974 A1*  5/2013  Hamakita ............ B62D 5/0403
                                                                180/444

FOREIGN PATENT DOCUMENTS

| JP | 1-102515 U    | 7/1989  |
| JP | 2002-67992 A  | 3/2002  |
| JP | 2011-255810 A | 12/2011 |
| JP | 2012-197028 A | 10/2012 |
| JP | 2013-71679 A  | 4/2013  |
| JP | 2013-184502 A | 9/2013  |
| JP | 2013-208933 A | 10/2013 |

* cited by examiner

POWER STEERING DEVICE

TECHNICAL FIELD

The present invention relates to a power steering device.

BACKGROUND ART

A power steering device for reducing the backlash of teeth of a worm wheel and a worm shaft and preventing tooth collision sounds by biasing a bearing supporting the worm shaft meshed with the worm wheel by a spring is known as a conventional power steering device.

As a power steering device of this type, JP2002-67992A discloses, an electric power steering device in which a guiding member is provided around a bearing supporting a drive gear configured to be rotated by a motor for steering assist. The guiding member guides a movement of the bearing in a biasing direction by being held in contact with a peripheral surface of the bearing.

SUMMARY OF INVENTION

The guiding member described in JP2002-67992A is provided to be fitted and fixed to a fitting hole formed on a housing. If there is a clearance between the inner peripheral surface of the fitting hole of the housing and the outer peripheral surface of the guiding member, the guiding member moves in the fitting hole. Therefore, a collision sound of the inner peripheral surface of the fitting hole and the outer peripheral surface of the guiding member is generated.

To eliminate the clearance between the inner peripheral surface of the fitting hole of the housing and the outer peripheral surface of the guiding member, high machining accuracy is required in forming the fitting hole on the housing. However, it is difficult to ensure such high machining accuracy.

The present invention aims to prevent the generation of a collision sound of a holder for housing a bearing and a gear case.

According to one aspect of the present invention, a power steering device includes: a worm shaft configured to rotate as an electric motor is driven; a worm wheel meshed with the worm shaft, the worm wheel being configured to transmit a rotational force of the electric motor to a rack shaft configured to turn wheels; a bearing that rotatably supports a tip side of the worm shaft; a gear case that houses the worm shaft; a biasing member configured to bias the worm shaft toward the worm wheel via the bearing; and a holder including a housing hole configured to house the bearing movably in a biasing direction of the biasing member. The holder includes a plurality of bulging parts formed to bulge radially outwardly, the bulging parts being configured to come into contact with an inner peripheral surface of the gear case.

DESCRIPTION OF EMBODIMENT

Embodiments of the present invention are described with reference to the drawings.

<First Embodiment>

A power steering device 100 according to an embodiment of the present invention is described with reference to FIGS. 1 to 4.

The power steering device 100 is a device mounted in a vehicle and configured to assist a steering force applied to a steering wheel by a driver.

Figure 1:
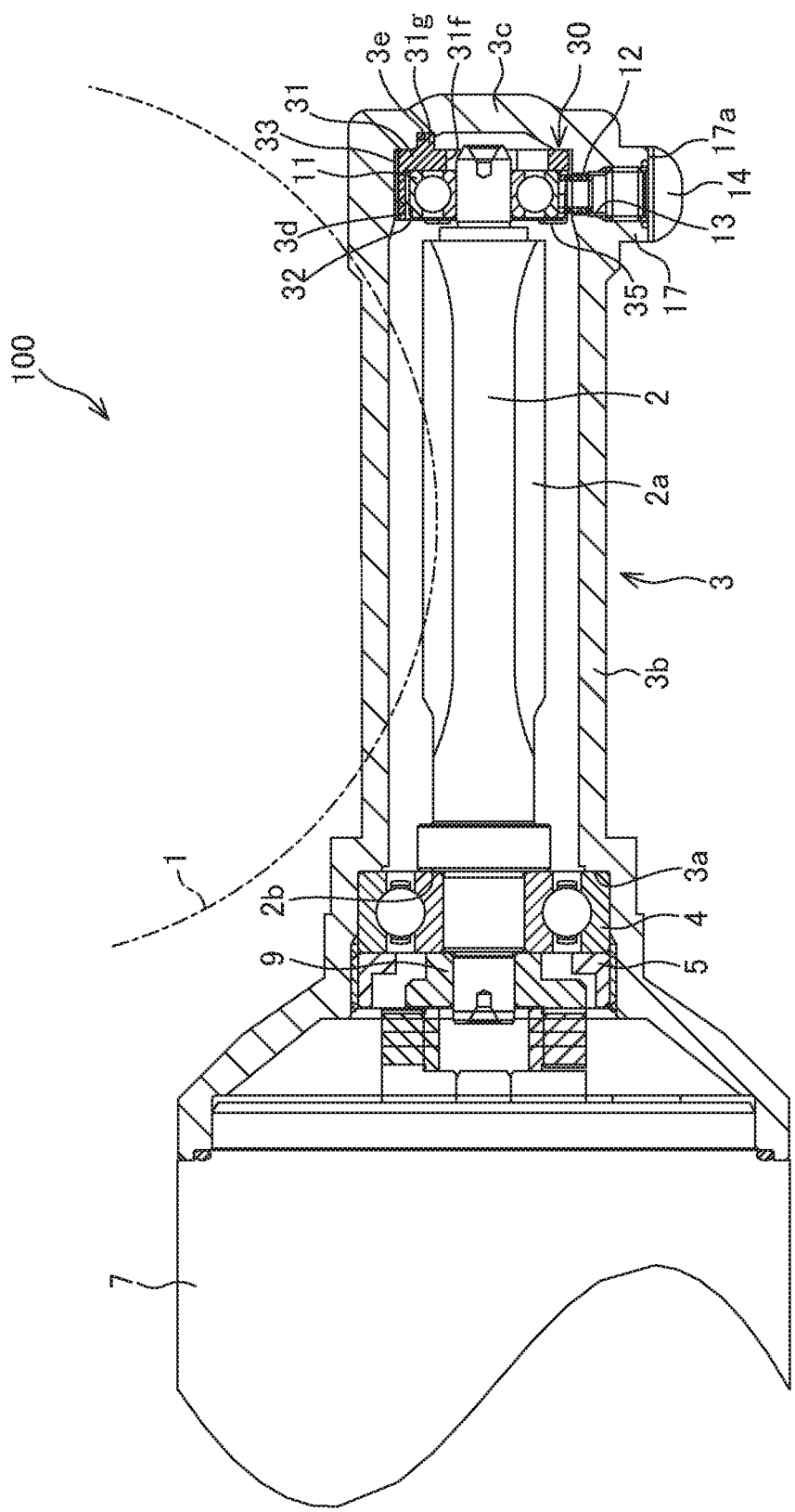
FIG. 1 is a sectional view showing a power steering device according to a first embodiment of the present invention.

As shown in FIG. 1, the power steering device 100 includes a worm shaft 2 coupled to an output shaft of an electric motor 7 and configured to rotate as the electric motor 7 is driven and a worm wheel 1 meshed with the worm shaft 2 and configured to transmit a rotational force of the electric motor 7 to a rack shaft configured to turn wheels. As the electric motor 7 is driven, the worm shaft 2 rotates and the rotation of the worm shaft 2 is decelerated and transmitted to the worm wheel 1. A worm speed reducer is configured by the worm wheel 1 and the worm shaft 2.

A steering shaft includes an input shaft linked to the steering wheel, an output shaft linked to the rack shaft and a torsion bar coupling the input shaft and the output shaft. The worm wheel 1 is provided on the output shaft.

The electric motor 7 outputs a torque corresponding to a steering torque calculated on the basis of a twisted amount of the torsion bar twisted by relative rotation of the input shaft and the output shaft. The torque output from the electric motor 7 is transmitted from the worm shaft 2 to the worm wheel 1 and applied as an assist torque to the output shaft of the steering shaft.

The worm shaft 2 is housed in a gear case 3 made of metal and the electric motor 7 is mounted on the gear case 3. The gear case 3 includes a peripheral wall 3b surrounding the worm shaft 2 and a bottom wall 3c facing the tip of the worm shaft 2. The peripheral wall 3b and the bottom wall 3c are integrally formed. As just described, the gear case 3 is excellent in waterproof property since having a bag-like structure instead of being configured to seal an opening on a bottom part by a lid.

Tooth parts 2a meshed with those of the worm wheel 1 are formed on a part of the worm shaft 2. The peripheral wall 3b of the gear case 3 is formed with an opening at a position corresponding to the tooth parts 2a and the tooth parts 2a of the worm shaft 2 and those of the worm wheel 1 are meshed through that opening.

A base end side of the worm shaft 2 on the side of the electric motor 7 is rotatably supported by a first bearing 4. In the first bearing 4, a ball is interposed between annular inner and outer rings. The outer ring of the first bearing 4 is sandwiched between a step part 3a formed in the gear case 3 and a lock nut 5 fastened in the gear case 3. The inner ring of the first bearing 4 is sandwiched between a step part 2b of the worm shaft 2 and a joint 9 press-fitted to an end part of the worm shaft 2. In this way, movements of the worm shaft 2 in an axial direction are regulated.

A tip side of the worm shaft 2 is rotatably supported by a second bearing 11. In the second bearing 11, a ball is interposed between annular inner and outer rings. The second bearing 11 is housed in a holder 30. The holder 30 is arranged in a holder housing hole 3d formed on a bottom side of the gear case 3 and having a circular inner peripheral surface.

A flange part 17 having a flat end surface 17a is formed to project on the outer peripheral surface of the tip side of the gear case 3. The flange part 17 is formed with a through hole 13. The through hole 13 is open on the inner peripheral surface of the holder housing hole 3d of the gear case 3. A coil spring 12 as a biasing member is housed in the through hole 13. An opening of the through hole 13 open on the end surface 17a of the flange part 17 is sealed by a bolt 14.

The coil spring 12 is compressed between the tip surface of the bolt 14 and the outer peripheral surface of the second bearing 11 and biases the second bearing 11 in a direction to reduce a clearance between the tooth parts 2a of the worm shaft 2 and those of the worm wheel 1. That is, the coil spring 12 is for biasing the worm shaft 2 toward the worm wheel 1 via the second bearing 11.

Figure 2:
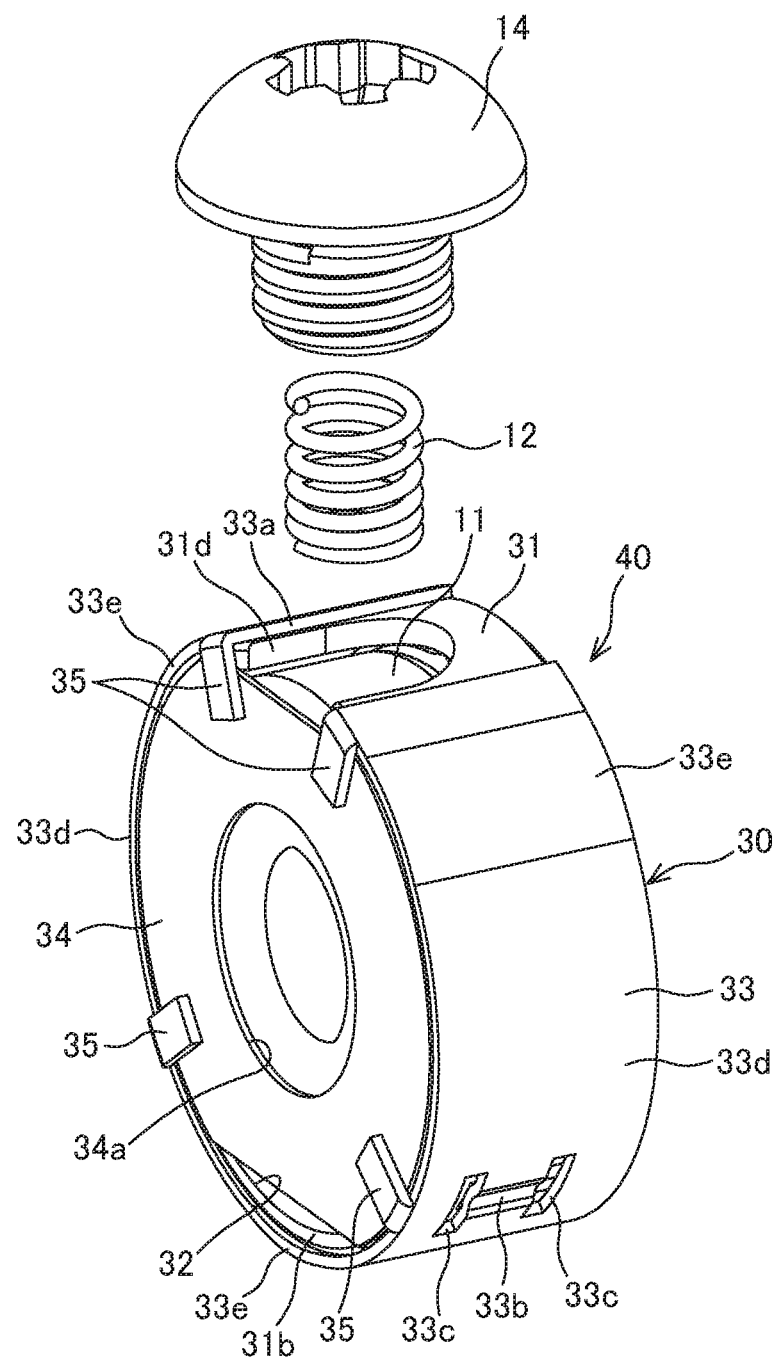
FIG. 2 is an exploded perspective view of a bearing unit, a spring and a bolt.
Figure 3:
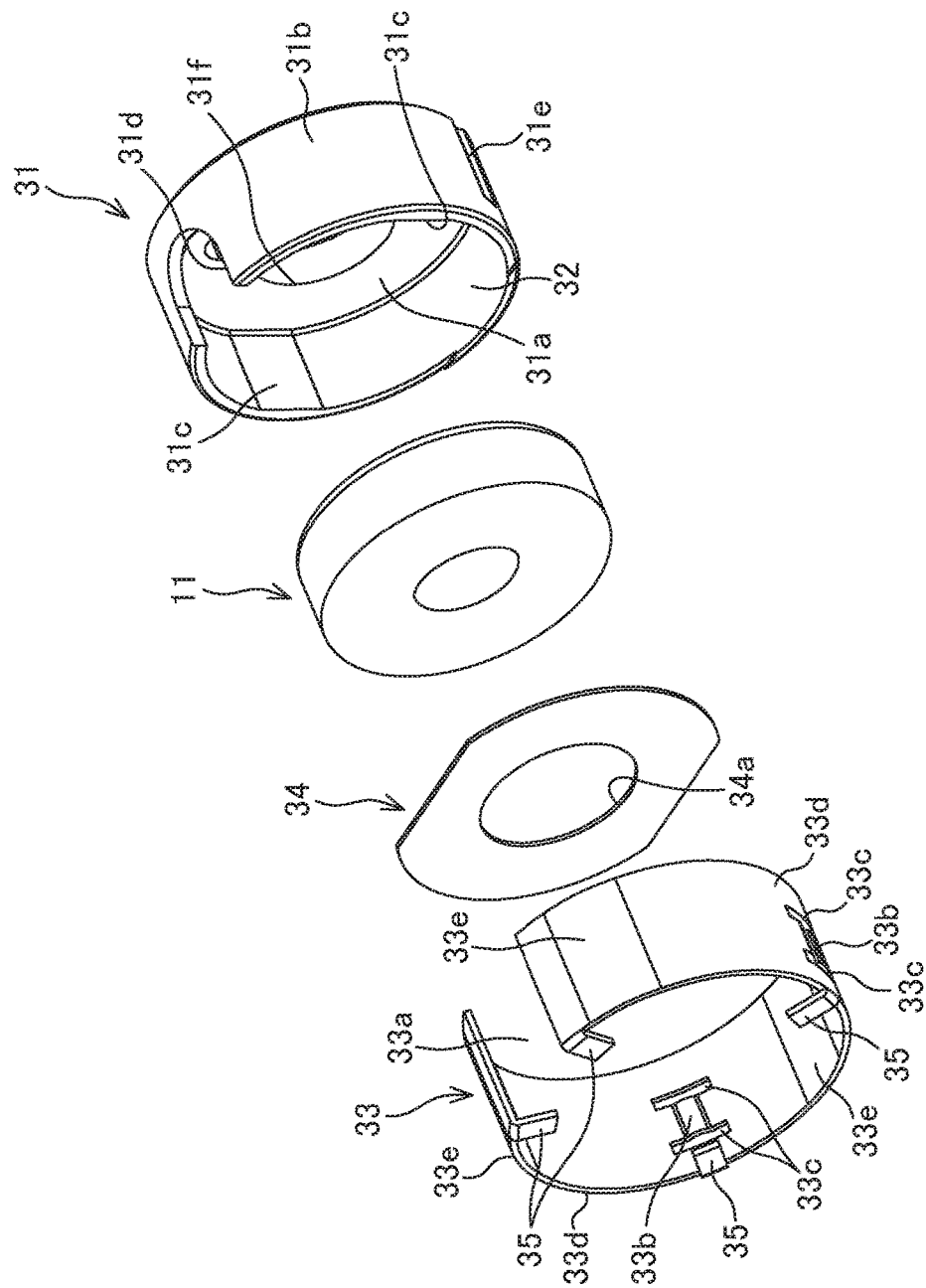
FIG. 3 is an exploded perspective view of the bearing unit.

Next, the holder 30 for housing the second bearing 11 is described mainly with reference to FIGS. 2 to 4.

The holder 30 includes a holder main body 31 having a bearing housing hole 32 for housing the second bearing 11, a support member 33 to be mounted on the outer peripheral surface of the holder main body 31 and a cover plate 34 for covering the second bearing 11 housed in the holder main body 31.

As shown in FIGS. 2 and 3, the holder main body 31 is a bottomed tubular member. The holder main body 31 includes a disk-like bottom part 31a to be in contact with the bottom part of the gear case 3 and a cylindrical cylinder part 31b surrounding the outer peripheral surface of the second bearing 11. The holder main body 31 is formed with the bearing housing hole 32 by the bottom part 31a and the cylinder part 31b. The holder main body 31 is made of resin.

The bearing housing hole 32 of the holder main body 31 is so formed that the second bearing 11 is movable in a biasing direction of the coil spring 12. Specifically, a pair of plane parts 31c is formed on the inner peripheral surface of the cylinder part 31b. The pair of plane parts 31c is formed to face each other and parallel to the biasing direction of the coil spring 12. A dimension between the pair of plane parts 31c is slightly longer than an outer diameter of the second bearing 11. Since the bearing housing hole 32 is shaped to be elongate hole in this way, the second bearing 11 can move toward the worm wheel 1 in the bearing housing hole 32 by the biasing force of the coil spring 12.

The cylinder part 31b of the holder main body 31 is formed with a cut 31d through which the coil spring 12 is inserted. Further, the outer peripheral surface of the cylinder part 31b is formed with groove parts 31e into which projections 33b of the support member 33 are to be fitted. The projections 33b will be described later.

As shown in FIG. 1, a through hole 31f through which the tip part of the worm shaft 2 is to be inserted is formed in an axial center of the bottom part 31a of the holder main body 31. Further, the back surface of the bottom part 31a is formed with a projection 31g to be fitted into a hole part 3e formed on the bottom part of the gear case 3 at a position deviated from the axial center. By fitting the projection 31g of the holder main body 31 into the hole part 3e of the gear case 3, the holder 30 is circumferentially positioned in the holder housing hole 3d of the gear case 3 by having the rotation thereof regulated.

Figure 4A:
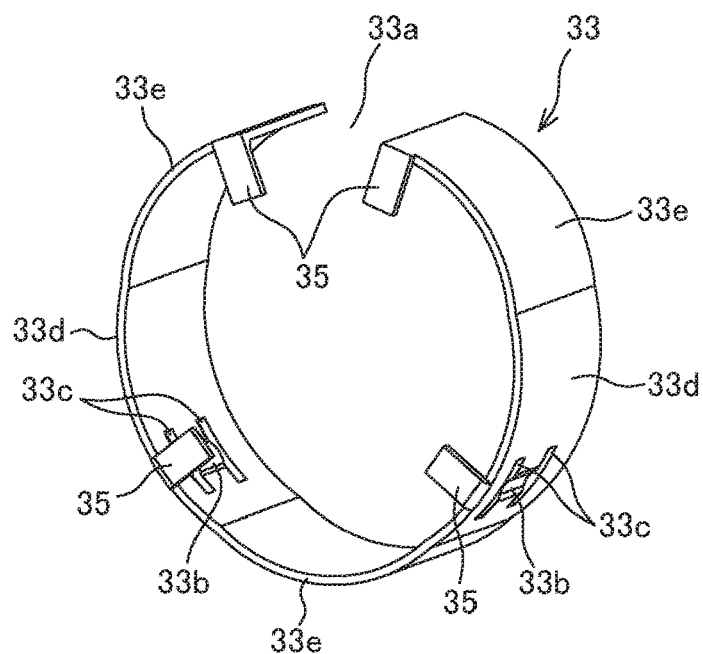
FIG. 4A is a perspective view of a support member.
Figure 4B:
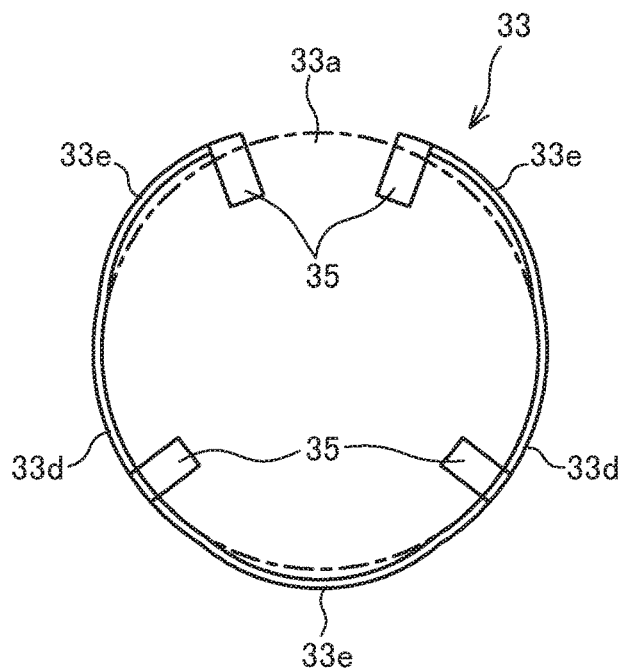
FIG. 4B is a plan view of the support member.

As shown in FIGS. 4A and 4B, the support member 33 is a C-shaped member formed by arcuately bending a long and narrow metal plate. The support member 33 includes an open part 33a between opposite end parts. The support member 33 has an inner diameter smaller than an outer diameter of the holder main body 31 in a state not mounted on the outer peripheral surface of the holder main body 31. Thus, the support member 33 is mounted on the outer peripheral surface of the holder main body 31 by canceling a diameter-enlarged state after the holder main body 31 is inserted into the support member 33 with the support member 33 enlarged in diameter in an elastic region. In this way, the support member 33 is fitted in close contact with the outer peripheral surface of the holder main body 31.

The support member 33 is formed with two inwardly facing projections 33b. The projection 33b is formed by inwardly bending a part between a pair of long and narrow openings 33c formed in parallel on the support member 33. By fitting the projections 33b into the groove parts 31e formed on the outer peripheral surface of the holder main body 31, the support member 33 is circumferentially positioned with respect to the holder main body 31. In this positioned state, as shown in FIG. 2, the circumferential position of the open part 33a of the support member 33 and that of the cut 31d of the holder main body 31 are aligned to expose the outer peripheral surface of the second bearing 11. The coil spring 12 is inserted through the open part 33a and the cut 31d to come into contact with the exposed outer peripheral surface of the second bearing 11.

As shown in FIG. 4B, the support member 33 includes arcuate close-contact parts 33d to be in close contact with the outer peripheral surface of the cylinder part 31b of the holder main body 31 and arcuate bulging parts 33e formed to bulge radially outwardly without being in close contact with the outer peripheral surface of the cylinder part 31b.

Three bulging parts 33e are formed at positions across the open part 33a and at a position facing the open part 33a. The bulging parts 33e are formed substantially at an interval of 120°. The bulging parts 33e are formed as arcs having a larger curvature than the close-contact parts 33d. Two close-contact parts 33d are formed between the bulging parts 33e. The projections 33b for circumferentially positioning the support member 33 with respect to the holder main body 31 are formed on the close-contact parts 33d. It should be noted that dashed-dotted lines shown in FIG. 4B are virtual line indicating extensions of the close-contact parts 33d.

In a state where the holder 30 is housed in the holder housing hole 3d of the gear case 3, the three bulging parts 33e are in contact with the inner peripheral surface of the holder housing hole 3d, whereas the two close-contact parts 33d face the inner peripheral surface of the holder housing hole 3d with small clearances defined therebetween. As just described, an outer diameter of the close-contact parts 33d of the support member 33 is slightly smaller than an inner diameter of the holder housing hole 3d with the support member 33 mounted on the outer peripheral surface of the holder main body 31.

The three bulging parts 33e of the support member 33 are slightly compressed and deformed by being in contact with the inner peripheral surface of the holder housing hole 3d in a state where the holder 30 is housed in the holder housing hole 3d of the gear case 3. Since the holder 30 is housed while being press-fitted into the holder housing hole 3d at three points, i.e. at the bulging parts 33e formed at an interval of 120° as just described, the holder 30 is radially positioned in the holder housing hole 3d by the bulging parts 33e and backlash in a radial direction is prevented. Since the holder 30 is so housed that the outer peripheral surface is partially press-fitted without the entire peripheral surface being pressed fitted into the holder housing hole 3d, high machining accuracy is not required in machining the inner peripheral surface of the holder housing hole 3d. Particularly, since the gear case 3 is formed into the bag-like structure in consideration of the waterproof property in the present embodiment, the holder housing hole 3d on the bottom part of the gear case 3 needs to be machined by inserting a tool into the gear case 3 through an opening of the gear case 3 on the side of the electric motor 7 and required machining accuracy is difficult to achieve. Also considering such a situation, the present embodiment in which the outer peripheral surface of the holder 30 is partially press-fitted into the holder housing hole 3d is effective.

The bulging parts 33e need not be arcs having a larger curvature than the close-contact parts 33d as long as they are formed to bulge radially outwardly without being in close contact with the outer peripheral surface of the cylinder part 31b. For example, the bulging parts 33e may be arcs having a smaller curvature than the close-contact parts 33d or arcs having the same curvature as the close-contact parts 33d.

The support member 33 includes a plurality of claw pieces 35 for preventing the second bearing 11 from coming out of the bearing housing hole 32 of the holder main body 31. The claw pieces 35 are formed to project inwardly from the peripheral edge of the support member 33.

If the claw pieces 35 directly come into contact with the second bearing 11, they may obstruct the rotation of the second bearing 11 or damage the second bearing 11. Thus, as shown in FIG. 2, the cover plate 34 is arranged in contact between an end surface of the cylinder part 31b of the holder main body 31 and the claw pieces 35 of the support member 33. Since the cover plate 34 is arranged to cover an end surface of the second bearing 11 exposed from the holder main body 31, the claw pieces 35 of the support member 33 come into contact with not the second bearing 11, but the cover plate 34. Thus, the claw pieces 35 are prevented from obstructing the rotation of the second bearing 11 and damaging the second bearing 11. The cover plate 34 is formed with a through hole 34a through which the tip part of the worm shaft 2 is to be inserted.

The second bearing 11 and the cover plate 34 are held by the claw pieces 35 of the support member 33 mounted on the outer peripheral surface of the holder main body 31. As just described, the second bearing 11, the holder main body 31, the support member 33 and the cover plate 34 are unitized into a bearing unit 40 as shown in FIG. 2. Thus, in mounting the second bearing 11 and the holder 30 into the holder housing hole 3d of the gear case 3, each component needs not be individually mounted and only the bearing unit 40 has to be mounted. Therefore, a mounting operation is very easy.

Next, functions and effects of the holder 30 are described.

The holder 30 supporting the second bearing 11 is fixed in the gear case 3 in a state where the three bulging parts 33e are in contact with the inner peripheral surface of the holder housing hole 3d and slightly compressed and deformed. In this way, the holder 30 is housed while being partially press-fitted at the three bulging parts 33e without the entire outer peripheral surface of the holder main body 31 being press-fitted into the holder housing hole 3d. If the entire outer peripheral surface of the holder 30 is pressed-fitted into the holder housing hole 3d, parts of the outer peripheral surface of the holder 30 unevenly come into contact with the inner peripheral surface of the holder housing hole 3d and the holder 30 may loosely move in the holder housing hole 3d if the machining accuracy of the inner peripheral surface of the holder housing hole 3d is poor. In such a case, a collision sound of the holder 30 and the holder housing hole 3d is generated. However, in the present embodiment, the holder 30 is housed into the holder housing hole 3d with the outer peripheral surface partially press-fitted. Thus, even if the machining accuracy of the inner peripheral surface of the holder housing hole 3d is poor, the holder 30 is radially positioned in the holder housing hole 3d via the three bulging parts 33e. Therefore, radial movements in the holder housing hole 3d are prevented. As a result, the generation of the collision sound of the holder 30 and the holder housing hole 3d is prevented.

Further, the second bearing 11 is normally biased in the direction to reduce the clearance between the tooth parts 2a of the worm shaft 2 and those of the worm wheel 1 by the biasing force of the coil spring 12. However, if a load exceeding the biasing force of the coil spring 12 is input from a wheel side through the worm wheel 1 and the worm shaft 2, the second bearing 11 moves in the bearing housing hole 32 of the holder main body 31 against the biasing force of the coil spring 12 and, associated with this, the holder 30 also radially moves in the holder housing hole 3d. Even in such a case, the generation of the collision sound of the holder 30 and the holder housing hole 3d is prevented since the two bulging parts 33e formed at the positions across the open part 33a of the support member 33 function as cushioning members.

Further, since the holder main body 31 is made of resin, an amount of thermal expansion is larger as compared to the gear case 3 made of metal. Thus, if the entire outer peripheral surface of the holder main body 31 is press-fitted into the holder housing hole 3d, the holder main body 31 may be fractured when the holder main body 31 thermally expands. However, since the holder main body 31 is partially press-fitted into the holder housing hole 3d via the bulging parts 33e of the support member 33 made of metal and mounted on the outer periphery, the thermal expansion of the holder main body 31 can be accommodated by the bulging parts 33e. Thus, the fracture of the holder main body 31 due to thermal expansion is prevented.

According to the above embodiment, the following effects are exhibited.

Since the holder 30 is fixed in the holder housing hole 3d of the gear case 3 via the bulging part 33e, radial movements of the holder 30 in the holder housing hole 3d are prevented. Thus, the generation of the collision sound of the holder 30 and the gear case 3 can be prevented.

Further, since the holder 30 is radially positioned in the holder housing hole 3d via the three bulging parts 33e, it is not necessary to provide a member such as an O-ring between the outer peripheral surface of the holder 30 and the inner peripheral surface of the holder housing hole 3d. Thus, the number of components can be reduced.

Further, since the holder 30 is housed with the outer peripheral surface partially press-fitted without the entire outer peripheral surface being press-fitted into the holder housing hole 3d, high machining accuracy is not required in machining the inner peripheral surface of the holder housing hole 3d. Thus, the bag-like structure for which it is difficult to achieve required machining accuracy, but which is excellent in waterproof property can be adopted as the structure of the gear case 3.

<Second Embodiment>

Figure 5A:
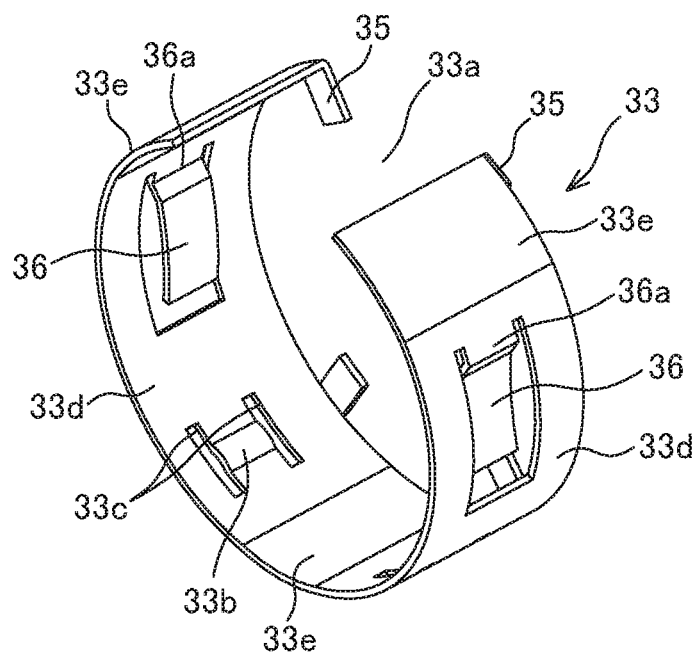
FIG. 5A is a perspective view of a support member in a power steering device according to a second embodiment of the present invention.
Figure 5B:
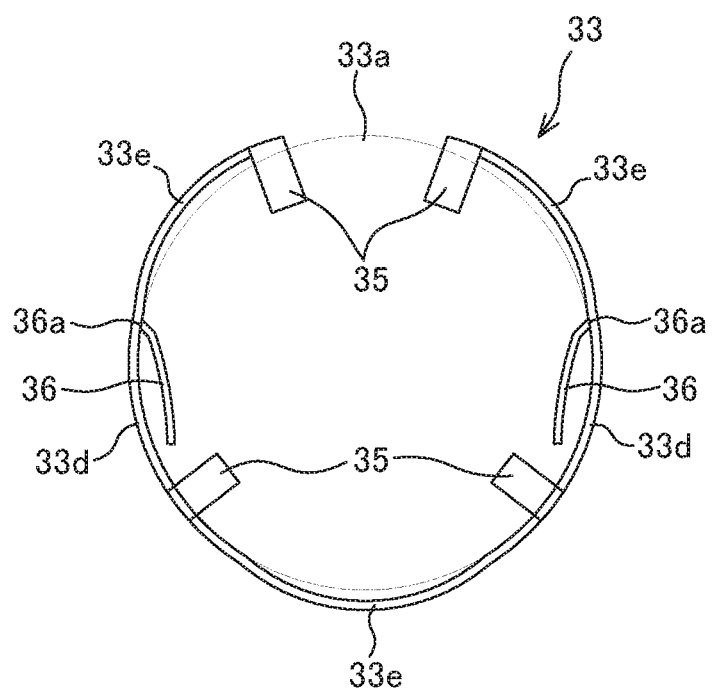
FIG. 5B is a plan view of the support member in the power steering device according to the second embodiment of the present invention.
Figure 6:
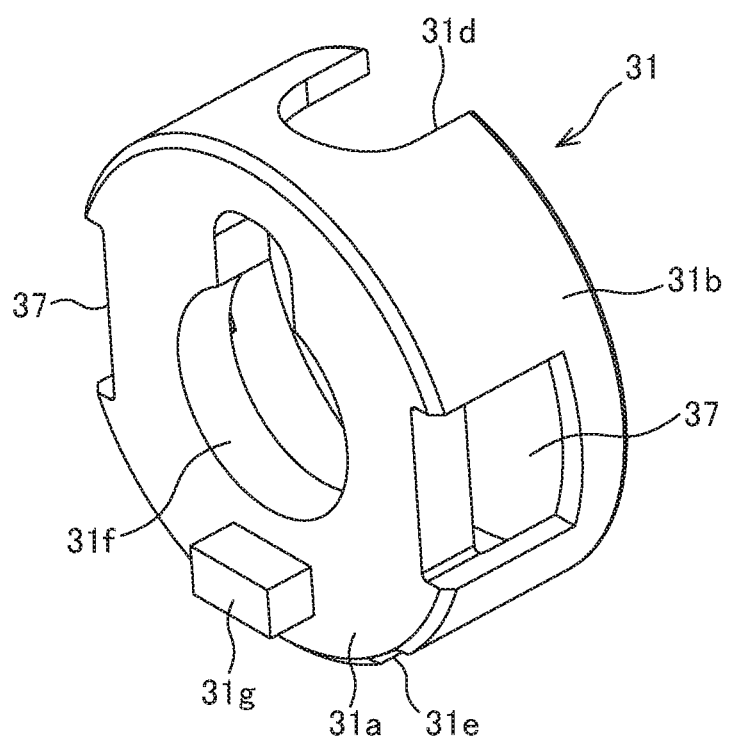
FIG. 6 is a perspective view of a holder main body in the power steering device according to the second embodiment of the present invention.

Next, a second embodiment of the present invention is described with reference to FIGS. 5 and 6. The following description is centered on points of difference from the above first embodiment and the same components as in the first embodiment are denoted by the same reference signs in FIGS. 5 and 6 and not described.

A support member 33 includes a pair of leaf spring parts 36 respectively formed at a pair of close-contact portions 33d. A holder main body 31 includes a pair of through holes 37 facing each other at positions displaced 90° from a cut 31d through which a coil spring 12 is to be inserted.

The pair of leaf spring parts 36 bias a second bearing 11 from positions symmetrical with respect to a biasing direction of the coil spring 12. Specifically, the leaf spring parts 36 are formed to face each other so as to sandwich and bias the second bearing 11 in directions perpendicular to the biasing direction of the coil spring 12. Only one end parts 36a of the pair of leaf spring parts 36 are coupled to the support member 33 and the other end sides formed as free ends apply biasing forces to the outer peripheral surface of the second bearing 11 through the pair of through holes 37 of the holder main body 31.

Since the pair of leaf spring parts 36 sandwich and bias the second bearing 11 in the directions perpendicular to the biasing direction of the coil spring 12, they act to constantly hold the second bearing 11 in center in a bearing housing hole 32 of the holder main body 31. Thus, the biasing force of the coil spring 12 stably acts on the second bearing 11, wherefore the backlash of teeth parts 2a of a worm shaft 2 and those of a worm wheel 1 is stably reduced.

The configuration of the pair of leaf spring parts 36 is not limited to the configuration for sandwiching and biasing the second bearing 11 in the directions perpendicular to the biasing direction of the coil spring 12, and the pair of leaf spring parts 36 have only to be configured to bias the second bearing 11 such that components of force are generated in the directions perpendicular to the biasing direction of the coil spring 12. That is, the pair of leaf spring parts 36 have only to be configured to bias the second bearing 11 from the positions symmetrical with respect to the biasing direction of the coil spring 12.

Further, the coil spring 12 may be omitted and the pair of leaf spring parts 36 may also have a function of the coil spring 12. That is, the pair of leaf spring parts 36 may exhibit both the function of reducing the backlash of the tooth parts 2a of the worm shaft 2 and those of the worm wheel 1 and the function of constantly holding the second bearing 11 in center in the bearing housing hole 32 of the holder main body 31. In this case, the pair of leaf spring parts 36 need to be formed to generate a component of force in the biasing direction of the coil spring 12 and components of force in the directions perpendicular to the biasing direction of the coil spring 12 as biasing forces applied to the second bearing 11 by the pair of leaf spring parts 36. The component of force in the biasing direction of the coil spring 12 acts to reduce the backlash of the tooth parts 2a of the worm shaft 2 and those of the worm wheel 1 and the components of force in the directions perpendicular to the biasing direction of the coil spring 12 act to constantly hold the second bearing 11 in center in the bearing housing hole 32 of the holder main body 31.

Modifications of the above embodiments are described below.

The above embodiments are configured such that the support member 33 is mounted on the outer peripheral surface of the holder main body 31. Instead of this configuration, the support member 33 may be omitted and the bulging parts 33e may be directly formed on the outer peripheral surface of the holder main body 31.

Further, in the above embodiments, the three bulging parts 33e of the support member 33 are formed at the positions across the open part 33a and the position facing the open part 33a. The bulging part(s) 33e may be formed at position(s) other than these three positions.

Further, in the above embodiments, the worm wheel 1 is provided on the output shaft of the steering shaft. Instead of this configuration, the worm wheel 1 may be provided on a pinion shaft provided separately from the steering shaft and meshed with the rack shaft.

Embodiments of this invention were described above, but the above embodiments are merely examples of applications of this invention, and the technical scope of this invention is not limited to the specific constitutions of the above embodiments.

This application claims priority based on Japanese Patent Application No.2013-267495 filed with the Japan Patent Office on Dec. 25, 2013, the entire contents of which are incorporated into this specification.

The invention claimed is:

1. A power steering device, comprising:
   a worm shaft configured to rotate as an electric motor is driven;
   a worm wheel meshed with the worm shaft, the worm wheel being configured to transmit a rotational force of the electric motor to a rack shaft configured to turn wheels;
   a bearing that rotatably supports a tip side of the worm shaft;
   a gear case that houses the worm shaft;
   a biasing member configured to bias the worm shaft toward the worm wheel via the bearing; and
   a holder including:
      a housing hole configured to house the bearing movably in a biasing direction of the biasing member,
      a holder main body formed with the housing hole, and
      a support member to be mounted on an outer peripheral surface of the holder main body, wherein
   the support member includes:
      a close-contact portion to be held in close contact with the outer peripheral surface of the holder main body, and
      a plurality of bulging parts formed to bulge radially outwardly, the bulging parts being configured to come into contact with an inner peripheral surface of the gear case, and
   the close-contact portion faces the inner peripheral surface of the gear case with a clearance defined between the close-contact portion and the inner peripheral surface of the gear case.

2. The power steering device according to claim 1, wherein:
   the support member has a C shape with an open part, and
   the bulging parts are formed at positions across the open part and at a position facing the open part.

3. The power steering device according to claim 1, wherein:
   the support member includes a pair of leaf spring parts inserted through a pair of through holes formed on the holder main body and configured to bias the bearing from positions symmetrical with respect to the biasing direction of the biasing member.

4. The power steering device according to claim 1, wherein:
   the support member includes a projection on the close-contact portion, the projection being fitted into a groove part formed on the outer peripheral surface of the holder main body.

5. The power steering device according to claim 1, wherein:
the support member includes a claw piece configured to prevent the bearing from coming out of the housing hole of the holder main body.

6. A power steering device, comprising:
a worm shaft configured to rotate as an electric motor is driven;
a worm wheel meshed with the worm shaft, the worm wheel being configured to transmit a rotational force of the electric motor to a rack shaft configured to turn wheels;
a bearing that rotatably supports a tip side of the worm shaft;
a gear case that houses the worm shaft;
a biasing member configured to bias the worm shaft toward the worm wheel via the bearing; and
a holder including a housing hole configured to house the bearing movably in a biasing direction of the biasing member, wherein
the holder includes a plurality of bulging parts formed to bulge radially outwardly, the bulging parts being configured to come into contact with an inner peripheral surface of the gear case,
the holder includes:
 a holder main body formed with the housing hole, and
 a support member to be mounted on an outer peripheral surface of the holder main body,
the support member includes:
 a close-contact portion to be held in close contact with the outer peripheral surface of the holder main body, and
 the bulging parts formed to bulge radially outwardly, and
the support member includes a projection on the close-contact portion, the projection being fitted into a groove part formed on the outer peripheral surface of the holder main body.

7. A power steering device, comprising:
a worm shaft configured to rotate as an electric motor is driven;
a worm wheel meshed with the worm shaft, the worm wheel being configured to transmit a rotational force of the electric motor to a rack shaft configured to turn wheels;
a bearing that rotatably supports a tip side of the worm shaft;
a gear case that houses the worm shaft;
a biasing member configured to bias the worm shaft toward the worm wheel via the bearing; and
a holder including a housing hole configured to house the bearing movably in a biasing direction of the biasing member, wherein
the holder includes a plurality of bulging parts formed to bulge radially outwardly, the bulging parts being configured to come into contact with an inner peripheral surface of the gear case,
the holder includes:
 a holder main body formed with the housing hole, and
 a support member to be mounted on an outer peripheral surface of the holder main body,
the support member includes:
 a close-contact portion to be held in close contact with the outer peripheral surface of the holder main body, and
 the bulging parts formed to bulge radially outwardly, and
the support member includes a claw piece configured to prevent the bearing from coming out of the housing hole of the holder main body.

* * * * *